United States Patent [19]

Yuasa et al.

[11] 4,401,386
[45] Aug. 30, 1983

[54] LIGHT MEASURING DEVICE

[75] Inventors: Yoshio Yuasa, Kawachinagano; Kazuhiko Naruse, Sakai, both of Japan

[73] Assignee: Minolta Camera Kabushiki Kaisha, Osaka, Japan

[21] Appl. No.: 208,474

[22] Filed: Nov. 19, 1980

[30] Foreign Application Priority Data

Nov. 29, 1979 [JP] Japan .................. 54/155275

[51] Int. Cl.³ .................. G01J 1/44
[52] U.S. Cl. .................. 356/226
[58] Field of Search .............. 356/218, 220, 221, 223, 356/226, 227; 354/31

[56] References Cited

U.S. PATENT DOCUMENTS 3,895,875  7/1975  Kitaura et al. .......... 356/226
4,176,955 12/1979  Yamada et al. .......... 356/222
4,309,090  1/1982  Yamada .................. 354/31

Primary Examiner—Bruce Y. Arnold
Attorney, Agent, or Firm—Wenderoth, Lind & Ponack

[57] ABSTRACT

A light meter includes memory units for storing light intensity signals obtained from a light intensity measuring device. A segment displayer is provided for displaying a value of exposure parameter based on selected one of the light intensity signals obtained from the memory units and light intensity measuring device. A dot displayer is also provided for displaying a value of exposure parameter based on respective one of the light intensity signals obtained from the memory units and light intensity measuring device.

14 Claims, 6 Drawing Figures

LIGHT MEASURING DEVICE

BACKGROUND OF THE INVENTION

The present invention relates to a light measuring device for use, for example, in photography for measuring the intensity of light reflected from or incident on an object to be photographed and for indicating one or more values of the exposure parameters, such as an aperture value, exposure value or shutter speed, as a function of the measured light intensity. More particularly, the present invention relates to an improvement in a display system employed in a light meter.

Conventionally, there has been proposed a light meter having a plurality of indication dots, composed of either light emitting diodes or as provided by a liquid crystal display, aligned such that the position of each dot relative to the other represents a specific value, such as, for example, an exposure parameter, as a function of the measured light intensity. An example of these dot display type arrangements, is disclosed in U.S. Pat. No. 3,895,875 to Kitaura et al., which issued on July 22, 1975. According to this arrangement, it is possible to energize two or more light emitting diodes at the same time on the basis of the measuring operations carried out for different objects. Although this dot display system is advantageous in that it visually indicates the difference between the values represented by the displayed dots, e.g., the obtained aperture values which are suitable for different objects, it requires a large space to accommodate the indication dots in order to acquire a fairly good identification or determination of the value indicated by each dot. Furthermore, since the dot merely shows the represented value by means of its relative position with respect to the other dots, the display element, i.e., the dot, by itself cannot indicate an absolute or exact value.

Another type of conventional light meter is a numeral display type which includes one or more, e.g. three, frames of segment indicators, each frame being so actuated as to form a figure of a numeral from 0 to 9. This type of arrangement is disclosed in U.S. Pat. No. 4,176,955 to Yamada et al., which issued on Dec. 4, 1979. According to this arrangement, since a set of three-frame-segment indicators occupies a large space in the light meter, it is difficult to employ two or more sets of such segment indicators in order to display two or more values at a time. Even if two or more sets of segment indicators were provided, it is difficult to visually compare the difference between the displayed values. Although the arrangement disclosed in U.S. Pat. No. 4,176,955 includes a display system having both dot indicators and segment indicators, the segment indicators merely show a calculated result obtained from stored values. There is no means to display any of th stored light intensity values in detail through the segment indicators.

A similar apparatus is disclosed in U.S. Pat. No. 4,309,090 to Yamada et al, which issued on Jan. 5, 1982 and assigned to the same assignee as the present application. This patent teaches the use of dot indicators and segment indicators at the same time with dot indicators showing the exposure parameter based on center-weighted measurement and segment indicators showing the exposure parameter based on average measurement, or vice versa depending on selection by a selecting switch. This application also has no means to display any of the stored light intensity values in detail through the segment indicators.

SUMMARY OF THE INVENTION

Accordingly, a general object of the present invention is to provide a light meter having an improved and sophisticated display system.

It is a further object of the present invention to provide a light meter which can indicate the relative relationship between a plurality of measured values in a visually recognizable manner as well as indicate a selected one of the values in detail by a numerical representation.

It is a still further object of the present invention to provide a light meter with a display system which can provide a great deal of information without requiring much space.

It is another object of the present invention to provide an improved display system for metering instruments which can indicate in a sophisticated manner relative differences between and/or among a plurality of measured values as well as provide a numerical representation of one of the values.

It is yet another object of the present invention to provide an improved display system for metering instruments which can round off a precise value, such as one expressed in increments of 0.1, to a rough value, such as one expressed in increments of 0.5.

It will be apparent to those skilled in the art that the value to be displayed or indicated may not be limited to the value directly corresponding to an output of a detector but may be the one determined with one or more parameters being associated or correlated with the output of the detector.

In accomplishing these and other objects, a light meter according to the present invention comprises a means for measuring an intensity of light and for producing a light-related signal as a function of the measured light intensity. The light-related signal is applied to a storing means in which at least one light-related signal is stored. A selecting means is provided for selecting one of the light-related signals obtained directly from the measuring means and from the storing means. The light meter further comprises first and second display means in which the first display means is provided for displaying in numerical representation a value based on the selected signal and the second display means is provided for displaying values based on respective light-related signals obtained from the measuring means and from the storing means, by means of the selective presentation of dot displays.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 1:
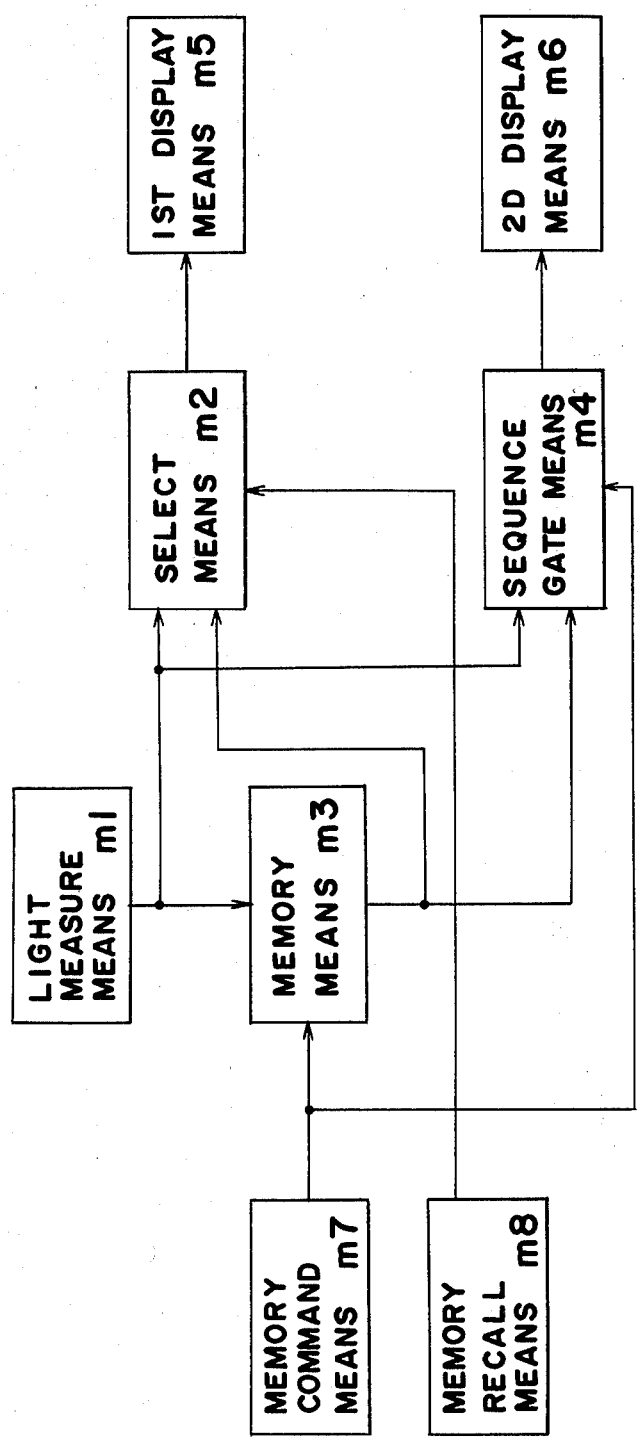
FIG. 1 is a block diagram of a light meter of the present invention.

Referring to FIG. 1, a photographic meter exposure according to one embodiment of the present invention includes a light measuring means m1 which measures the light intensity of an object and produces a signal as a function of the measured light intensity which is referred to as a light intensity signal. The light intensity signal produced from the light measure means m1 is applied to a select means m2, a memory or storage means m3 and a sequence gate means m4. The memory means m3 has a plurality of memory units, each being so actuated by a command signal from a memory command means m7 as to store the light intensity signal from the light measure means m1. Since the memory command means m7 sequentially actuates the plurality of memory units, the memory units may store different light intensity signals obtained from different objects, or from the same object but at different times under different circumstances, e.g., one with flash light and one without flash light.

The select means m2 receives a light intensity signal directly from the light measure means m1 and also receives a number of light intensity signals stored in the memory means m3, and selects one light intensity signal by a recall signal obtained from a memory recall means m8. When the recall signal indicates no particular memory unit, the select means m2 selects the light intensity signal from the light measure means m1. When the recall signal indicates a particular memory unit in the memory means m3, the select means m2 selects the light intensity signal stored in the particular memory unit. The selected light intensity signal is transmitted to a first display means m5 which is so designed as to calculate, using the selected light intensity signal, a suitable exposure parameter value, such as an aperture value signal or exposure value signal, and to display calculated exposure parameter value in detail, e.g., by a three place number represented in a digital form, having an integer portion and a fraction portion.

The sequence gate means m4 receives a light intensity signal directly from the light measure means m1 and a number of light intensity signals stored in the memory means m3 and all the received light intensity signals are applied to the second display means m6 which is designed so as to calculate a suitable exposure parameter value for each one of the light intensity signals, and to display all the calculated exposure parameter values in brief, e.g., by the actuation of corresponding light emitting diodes aligned along a scale marked with figures of exposure parameter values. Each of the aforementioned means is described in detail below.

Figure 2:
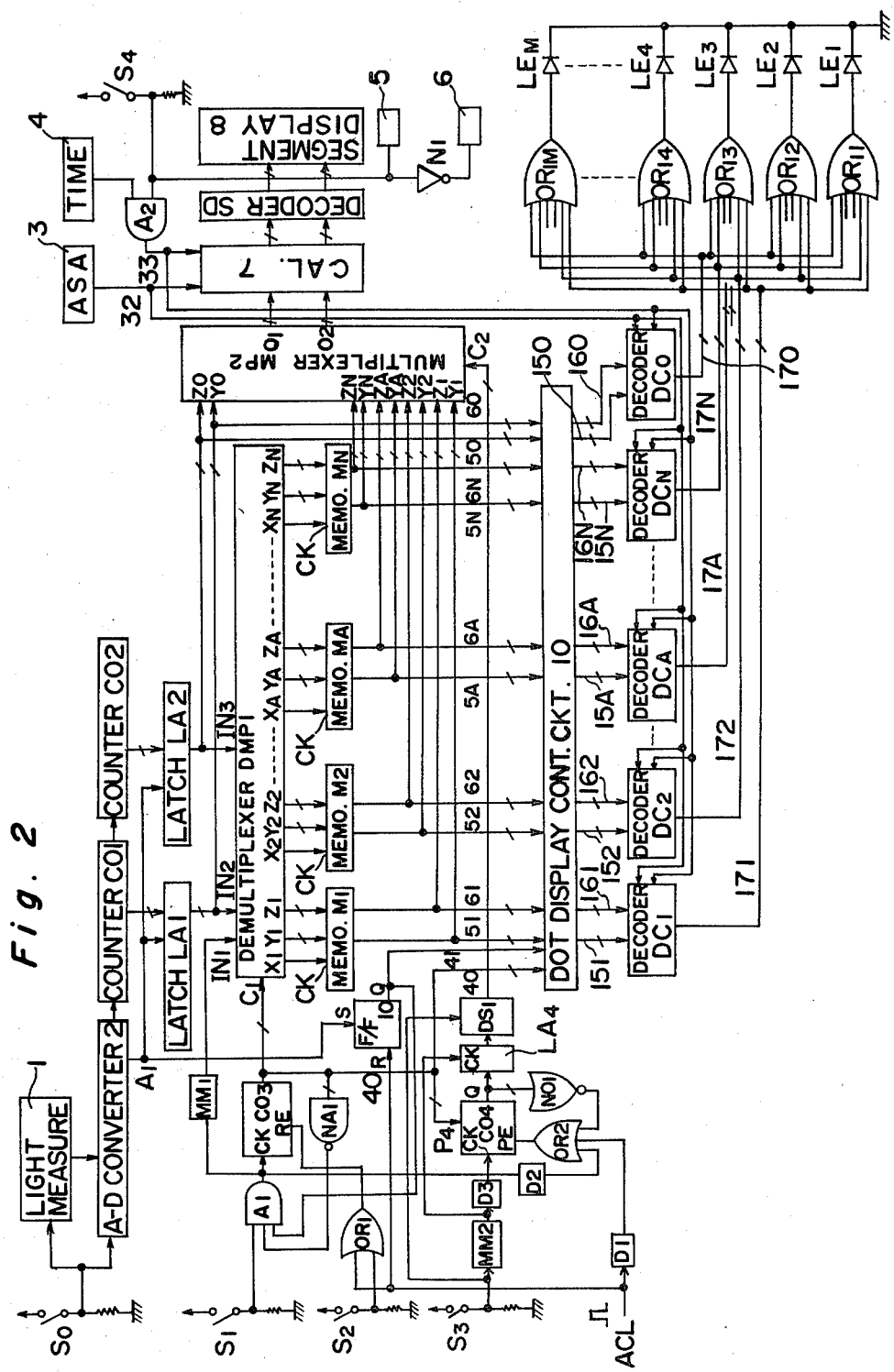
FIG. 2 is a circuit diagram of a light meter shown in FIG. 1.

Referring to FIG. 2, the light measure means m1 includes a switch S0 which is coupled to a light measure circuit 1 and an A-D converter 2. Upon closure of the switch S0, a pulse is applied to the light measure circuit 1 and also to the A-D converter 2 for actuating the light measure circuit 1 to produce a light intensity signal indicative of brightness, or light intensity, of an object represented in a form of APEX value of Bv and for actuating the A-D converter 2 for a predetermined period of time. During this time, th A-D converter 2 converts the received analog signal corresponding to the APEX value Bv of the measured light into a digital signal and produces a train of pulses the number of which corresponds to the Bv value with the rate of one pulse per 0.1 Bv. The train of pulses from the A-D converter is applied to a first binary coded decimal (BCD) counter CO1 which may count up to nine pulses. When and if the tenth pulse is applied, the counter CO1 resets itself and produces a carrier pulse which is applied to a second BCD counter CO2. Therefore, the counter CO1 holds a fractional portion of the light intensity signal Bv and the counter CO2 holds an integer portion of the light intensity signal Bv. After the predetermined period of time in which the A-D conversion is carried out and the number of pulses from the A-D converter 2 is counted in the counters CO1 and CO2, the A-D converter 2 produces a signal A1 for the indication of completion of signal processing in the A-D converter 2 and in the counters CO1 and CO2. The signal A1 is applied to latches LA1 and LA2 which are respectively coupled to counters CO1 and CO2 to receive the counted signals in the counters CO1 and CO2, whereby the latches LA1 and LA2 operate to latch or hold their received signal. Accordingly, the latch LA1 stores the fraction portion of the light intensity signal Bv and the latch LA2 stores the integer portion of the same. Since the signal applied from the counter, e.g., CO1 to the latch LA1 is represented by a plurality of bits, the wiring extended therebetween is presented in a form of a bundle of wires. To indicate such a bundle of wires in the drawings, a slash, or virgule, is provided to the interconnecting line.

The select means m2 includes a multiplexer MP2 having a plurality of pairs of input terminals Z0, Y0; Z1, Y1; Z2, Y2; . . . ; ZA, YA; . . . ; and ZN, YN (N being an integer and A being any number from 1 to N), a control input terminal C2 and a pair of output terminals O1 and O2. The first pair of input terminals Z0 and Y0 are connected to the latches LA1 and LA2, respectively, and the remaining pairs of input terminals are connected to memory units which will be explained later. The control input terminal C2 receives a numeral signal of a number of "0" to "N". When the signal received by the control input terminal C2 is "0", the multiplexer MP2 is so actuated as to connect the pair of input terminals Z0 and Y0 to the ouput terminals O1 and O2. On the other hand, when the numeral signal to the control input terminal C2 represents a numeral "A", the multiplexer MP2 is so actuated as to connect the pair of input terminals ZA and YA to the output terminals O1 and O2, respectively.

The first display means m5 includes a calculator 7, decoder SD and a segment display 8 which are connected in cascade to the output terminals O1 and O2 of the multiplexer MP2. The calculator 7 is also connected to an ASA (film sensitivity) setting circuit 3 by a lead line 32 and an exposure time setting circuit 4 by a lead line 33 through an AND circuit A2. The AND circuit A2 is also connected to a switch S4 which can be manually turned on or off to determine whether or not the information of exposure time from the setting circuit 4 should be applied to the calculator 7. When the switch S4 is turned on to supply both information of ASA and exposure time, the calculator 7 calculates an aperture value Av represented in the APEX system based on the selected light intensity Bv obtained from the multiplexer MP2. On the other hand, when the switch S4 is turned off to supply only the information of ASA, the calculator 7 calculates an exposure value Ev represented in the APEX system based on the selected light intensity signal Bv. The calculated aperture value Av or calculated exposure value Ev is applied through the decoder SD to the segment display 8 for the display of the calculated value in decimal numerals using three frames, such as shown at 20a of FIG. 6.

According to a preferred embodiment for displaying the exposure value Ev, the upper two frames are used for displaying an integer portion of a whole number of the exposure value Ev and the lower frame is used for displaying a functional portion of the whole number of the exposure value Ev. For displaying the aperture value Av, the upper two frames are used for displaying one of the well known aperture values, such as, 1, 1.4, 2.8, 4, 5.6, 8.0, 11, etc., which are calculated using the integer portion of the APEX aperture value Av, and the lower one frame is used for displaying the fraction portion of the APEX aperture value Av, having a weight of 0.1 EV. In other words, the first display means can display a value of exposure parameter in increments of 0.1 EV.

The first display means m5 further includes display units 5 and 6, each formed by a light emitting diode. The display 5 is connected directly to the switch S4 and the display 6 is connected through an inverter to the switch S4. When the switch S4 is on, the display unit 5 is lit to indicate that the segment display 8 is displaying the aperture value, and when the switch S4 is off, the display unit 6 is lit to indicate that the segment display 8 is displaying the exposure value.

The memory means m3 includes a demultiplexer DMP1 having three input terminals IN1, IN2 and IN3, in which the input terminals IN2 and IN3 are connected to the latches LA1 and LA2, respectively. The input terminal IN1 receives a rectangular pulse signal from a monostable circuit MM1 of the memory command means m7 with a predetermined pulse duration for actuating the demultiplexer DMP1 during said pulse duration. The demultiplexer DMP1 has a plurality of triplets of output terminals X1, Y1, Z1; X2, Y2, Z2; ...; XA, YA, ZA; ...; and XN, YN, ZN which are connected to a plurality of memory units M1 to MN in such a manner that each set of triplet of output terminals is connected to one memory unit. For example, output terminals X1, Y1 and Z1 are connected to the memory unit M1. The demultiplexer DMP1 further has a control input terminal C1 which receives a numeral signal of a number from "0" to "N" so as to electrically connect the input terminals IN1, IN2 and IN3 with one triplet of output terminals having an identical suffixed numeral with the received numeral signal. For example, when the received numeral signal is "2", the input terminals IN1, IN2 and IN3 are connected with second triplet of output terminals X2, Y2 and Z2, respectively. It is to be noted that in each of the triplets, the terminal disignated by a reference character X is connected to a clock terminal CK of the corresponding memory unit for applying the rectangular pulse to the memory unit, and the terminals designated by reference characters Y and Z are so connected as to provide signals from the latches LA1 and LA2 to the memory unit. Each of the memory units has a pair of outputs which are connected to the input terminals of the multiplexer MP2 as described above, and also to a dot display control circuit 10 of the sequence gate means m4.

The sequence gate means m4 includes a dot display control circuit 10 having a plurality of input terminals connected with lead lines 40, 41, 50, 60, 51, 61, 52, 62, . . , 5A, 6A, . . . , 5N, 6N. The lead line 40 extends thereto from the memory command means m7 and supplies a signal indicative of a numeral from "0" to "N". The lead line 41 extends thereto from an R-S flip-flop circuit F/F10 which has its set terminal S connected to the A-D converter 2 for receiving the signal A1. The reset terminal of the circuit F/F10 is connected to an ACL line which produces a pulse when the light meter is turned on to supply electric power to the circuit of FIG. 2. Upon receipt of a pulse from the ACL line to the reset terminal R, the circuit F/F10 produces a low level signal from the output terminal Q. Then, when the light measuring of a first object is completed, the set terminal S is supplied with the signal A1, causing the output terminal Q to produce a high level signal. Accordingly, the lead line 41 provides high level signal after the completion of the first light measuring operation. The lead lines 50 and 60 are connected to the latches LA1 and LA2 for receiving the light intensity signal Bv which has just been measured. The lead lines 51 and 61 are connected to the memory unit M1 for receiving the light intensity signal Bv which has been previously measured and stored in the memory unit M1. Similarly, the other pairs of lead lines, e.g., 5A and 6A are connected to a memory unit having a reference character M with an identical suffixed numeral, i.e., in this case MA. The dot display control circuit 10 further has a plurality of output terminals which are connected to a plurality of lead lines 150, 160, 151, 161, . . . , 15A, 16A, . . . , 15N, 16N. A detail of the dot display control circuit 10 is described below.

Figure 3:
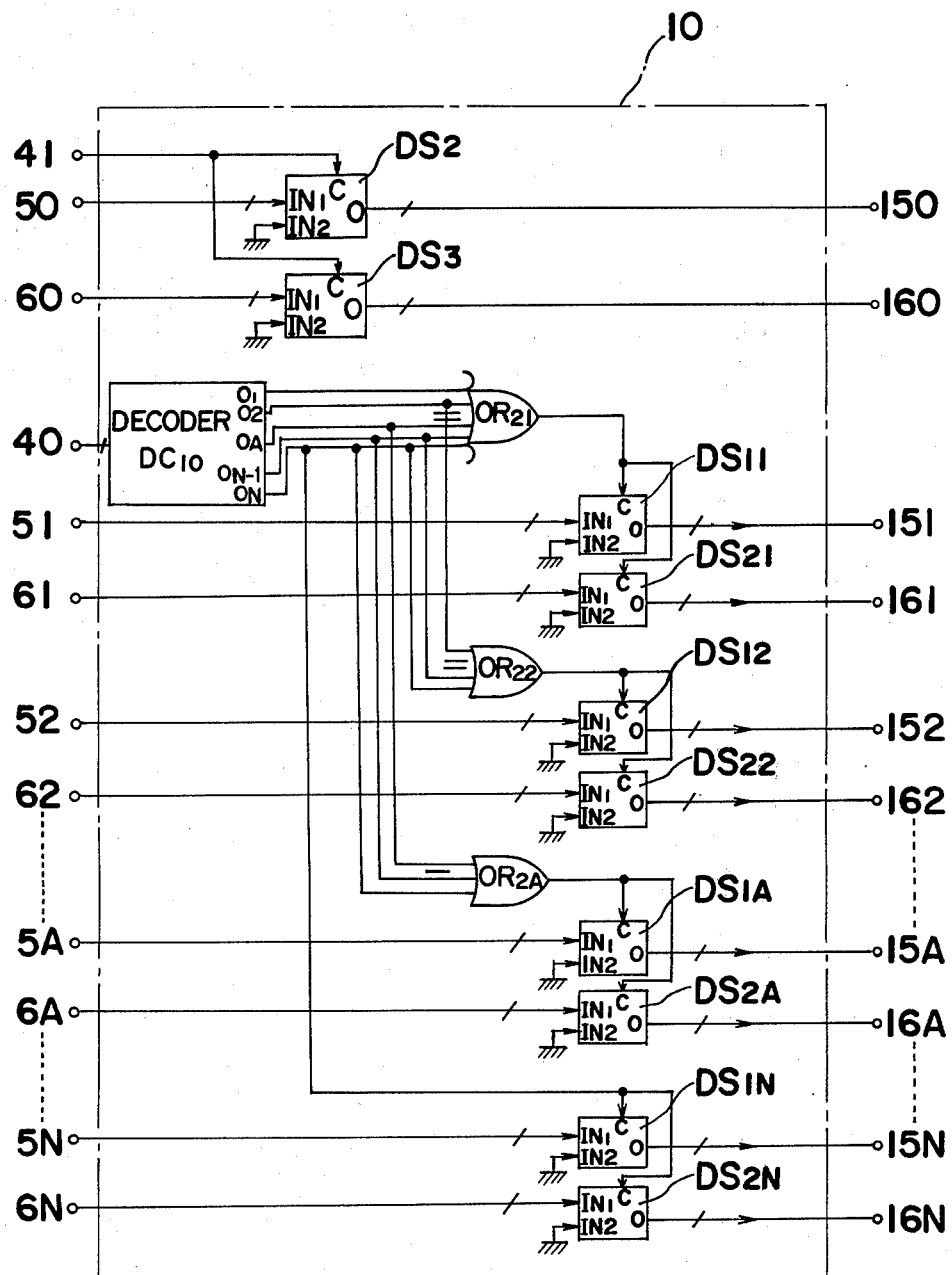
FIG. 3 is a detailed circuit diagram of a dot display control circuit of FIG. 2.

Referring to FIG. 3, the dot display control circuit 10 includes a pair of data selectors DS2 and DS3, each having first and second input terminals IN1 and IN2, control terminal C and output terminal O. The control terminal C of the respective data selectors DS2 and DS3 is connected to the line 41, and the second input terminal IN2 of the respective data selectors DS2 and DS3 is connected to ground. The first input terminal IN1 and the output terminal O of the data selector DS2 are connected to lead lines 50 and 150, respectively. Similarly, the first input terminal IN1 and the output terminal O of the data selector DS3 are connected to lead lines 60 and 160, respectively. When the lead line 41 carries a low level signal as occurred before the first light measuring operation, the second input terminal IN2 is connected to the output terminal O. Accordingly, each of the lead lines 150 and 160 produces a low level signal. On the other hand, when the lead line 40 carries a high level signal as occurred after the first light measuring operation, the first input terminal IN1 is connected to the output terminal O. Accordingly, the lead lines 150 and 160 produce the signal carried in the lead lines 50 and 60, respectively, i.e., the signal indicative of the light intensity which is stored in the latches LA1 and LA2.

The dot display control circuit 10 further includes a decoder DC10 having an input terminal connected to the lead line 40 and a plurality of output terminals O1, O2, . . . , OA, . . . , ON. In the decoder DC10, the numeral signal indicating the number of light intensity signals stored in the memory means m3 and carried by the line 40 is used for producing a high level signal from the corresponding number of output terminals counted from the ones with lower suffixed numerals. For example, when the applied numeral signal represents a numeral "A", the decoder DC10 produces a high level signal from its outputs O1 to OA, and the rest of the outputs are remained low. Also, a plurality of OR circuits OR21, OR22, ..., OR2A, ..., OR2 (N-1) are provided. The OR circuit OR21 has N input terminals which are connected respectively to all the output terminals of the decoder DC10. The next OR circuit OR22 has N-1 input terminals which are connected respectively to output terminals of the decoder DC10 except for the first output terminal O1. In general, the number of input terminals of the OR circuits is decreased one by one as the suffixed numeral of the designating reference character of the OR circuit increases, and the output terminals of the decoder DC10 which are connected to the respective OR circuits become less one by one, leaving the ones with lower suffixed numerals, as the suffixed numeral of the designating reference character of the OR circuit increases. For example, the OR circuit OR2A has N-A+1 terminals which are connected to output terminals OA, O(A+1), ..., ON, respectively, of the decoder DC10.

A plurality of pairs of data selectors DS11, DS21; DS12, DS22; ...; DS1A, DS2A; ...; DS1N, DS2N are provided, each pair arranged in a similar manner to the above mentioned pair of data selectors DS2 and DS3. The control input terminal of the first pair of the data selectors DS11 and DS21 is connected to the putput terminal of the OR circuit 21. Likewise, the control input terminals of the respective data selectors of the other pairs, except the last pair of the data selectors DS1N and DS2N, are respectively connected to the output terminals of the OR circuits with the identical suffixed numeral. The control input terminals of the last pair of data selectors DS1N and DS2N are connected directly to the output terminal ON of the decoder DC10. Each pair of data selectors, e.g., DS1A and DS2A is so actuated as to connect the memory unit MA through lead lines 5A and 6A having reference character with identical suffixed numeral, with a decoder DCA of the second display means m3 through lead lines 15A and 16A having reference character with identical suffixed numeral. This operation of connection between the memory unit and the corresponding decoder in the second display means m3 is carried out only when the memory unit is stored with light intensity signal. For example, when three light intensity signals are stored in the memory units M1, M2 and M3, respectively, a signal indicative of numeral "3" is applied to the decoder DC10 to allow each of the OR circuits OR21, OR22 and OR23 to produce a high level signal. Accordingly, the first, second and third pairs of the data selectors are actuated.

Referring again to FIG. 2, the second display means m6 includes a plurality of decoders DC0, DC1, ..., DCA, ..., DCN, a plurality of OR circuits OR11, OR12, ..., OR1M (M being an integer) and a plurality of light emitting diodes LE1, LE2, ..., LEM aligned along a scale marked with figures corresponding to values of one exposure parameter, such as aperture values, with a pitch of 0.5 Ev. Each of the decoders DC0 to DCN is provided to calculate a value of exposure parameter and to determine which one of the light emitting diode should be lit to indicate the calculated value. For the latter purpose, the calculated value is doubled, and the fraction portion is rounded off to facilitate the classifying operation. Since all the decoders DC0 to DCN has an identical structure to each other, the decoder DC1 is shown in detail in FIG. 4 as one example.

Figure 4:
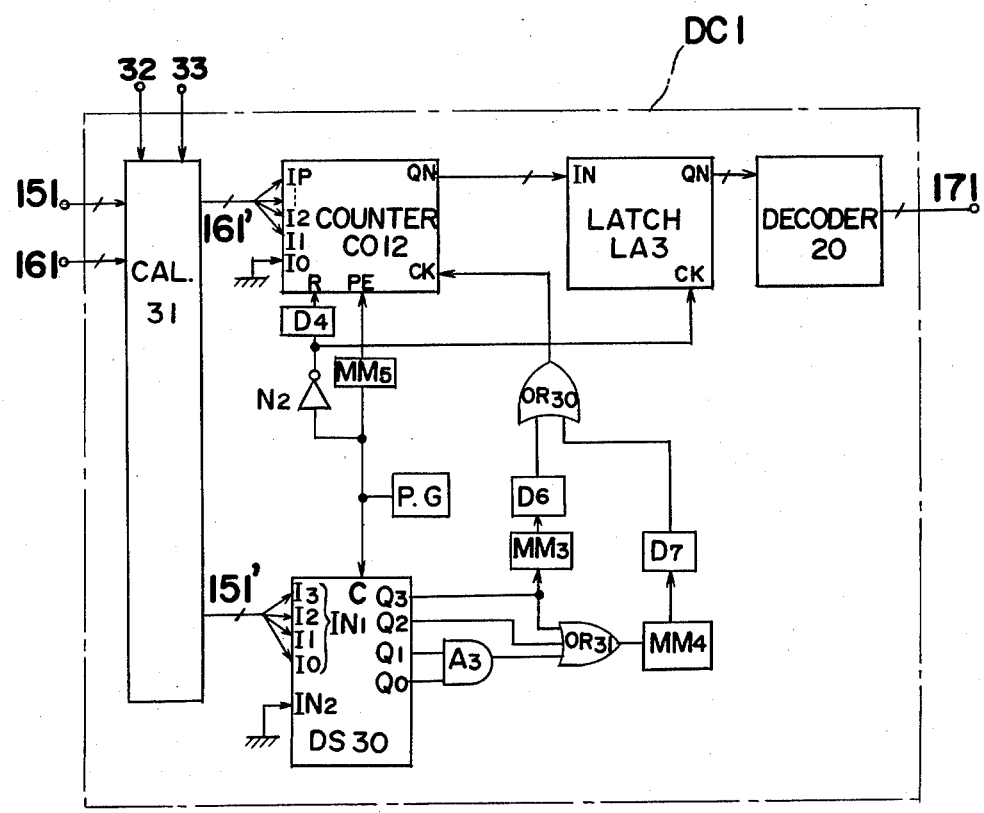
FIG. 4 is a detailed circuit diagram of a decoder connected to the display control circuit of FIG. 3.

Referring to FIG. 4, the decoder DC1 inludes a calculator 31 of an identical structure to the calculator 7 provided in the first display means m5. The input terminals of the calculator 31 receive a light intensity signal from the dot display control circuit 10 through lines 151 and 161 and also a signal indicative of film ASA through the line 32 and a signal indicative of exposure time through the line 33. The output terminal 161' of the calculator 31 produces a signal indicative of an integer portion of a calculated value of exposure parameter, such as an exposure value Ev or an aperture value Av, and the output terminal 151' produces a signal indicative of a fractional portion of the same.

Connected to the output terminal 151' is a data selector DS30 having an input terminal IN1 connected to the output terminal 151' of the calculator 31 and an input terminal IN2 connected to ground. Since the signal produced from the output terminal 151' is a four-bit signal carried by a bundle of four lines, the line extending from the output terminal 151' is separated into four parts to interface with four input taps I0, I1, I2 and I3 of the input terminal IN1 of the data selector DS30. The data selector DS30 further has four output taps Q0, Q1, Q2 and Q3 which are weighted $2^0$, $2^1$, $2^2$ and $2^3$, respectively, and a control terminal C which receives a pulse signal from a pulse generator PG. When the pulse is present to provide a high level signal to the control terminal C, the data selector DS30 is so actuated as to connect the four input taps I0, I1, I2 and I3 with the four output taps Q0, Q1, Q2 and Q3, respectively, and when the pulse is not present, the four output taps Q0 to Q3 are connected with the input terminal IN2.

The output taps Q0 and Q1 are connected to an AND circuit A3 which is further connected to an OR circuit OR31. The output taps Q2 and Q3 are connected to the OR circuit 31. The output tap Q3 is also connected to a monostable circuit MM3 which is in turn connected to a delay circuit D6. Connected to the output of the OR circuit OR31 is a monostable circuit MM4 which is further connected to a delay circuit D7. The delay circuits D6 and D7 are connected to an OR circuit OR30 which is further connected to a clock terminal of an up-counter CO12. It is to be noted that the delay circuit D7 has a delay time which is shorter than that of the delay circuit D6. Accordingly, a pulse simultaneously produced from each of the monostable circuits MM3 and MM4 will be applied to the OR circuit OR30 in a time lagged relationship. Before describing the detail of the up-counter CO12, the manner in which the signal from the output terminal 151' of the calculator 31 is processed will be explained.

Since the signal from the output terminal 151' is a four-bit signal indicating a numeral from "0" to "9", the output taps (Q3,Q2,Q1,Q0) may produce one BCD signal from (0000) to (1001). When the output taps (Q3,Q2,Q1,Q0) produce (0000), (0001) or (0010), i.e., "0", "1" or "2" in decimal, both of the monostable circuits MM3 and MM4 receive a low level signal to provide no pulse signal to the clock input CK of the counter CO12. When the output taps (Q3,Q2,Q1,Q0) produce (0011), (0100), (0101), (0110) or (0111), i.e., "3", "4", "5", "6" or "7", the monostable circuit MM3 receives a low level signal and the monostable circuit MM4 receives a high level signal. Accordingly, one pulse signal is produced from the monostable circuit MM4, which is applied to the clock input K of the counter CO12. When the output taps (Q3,Q2,Q1,Q0) produce (1000) or (1001), i.e., "8" or "9", each of the monostable circuits MM3 and MM4 receives high level signal. Accordingly, two pulse signals are applied to the clock input CK of the counter CO12, one from each of the monostable circuits MM3 and MM4.

The up-counter CO12 has a plurality of input taps I0, I1, I2, ..., IP (P being an integrer); the input tap I0 which is arranged to carry the BCD signal of the lowest digit ($2^0$), is connected to ground and the input taps I1 to IP are connected to a bundle of lines from the output terminal 161' of the calculator 31. Accordingly, when the counter CO12 is loaded with the numeral signal from the input taps I0 to IP, which occurs when a pulse is applied to a preset-enable terminal PE from the pulse generator PG through a monostable circuit MM5, the loaded numeral is equal to a doubled value of the numeral produced from the output terminal 161' of the calculator 31. The loaded numeral is then maintained so as to be the same or is counted up by one or two, depending on the number of pulses applied to the clock input CK of the up-counter CO12, i.e., on the numeral signal produced from the output terminal 151'. When the output terminal 151' produces a numeral from "0" to "2", no pulse will be applied to the clock input CK as explained above. Accordingly, in this case, the loaded numeral in the counter CO12 remains the same. When the output terminal 151' produces a numeral from "3" to "7", one pulse will be applied to the clock input CK of the counter CO12 for counting up, by one, the loaded numeral in the counter CO12. When the output terminal 151' produces a numeral "8" or "9", two pulses will be applied to the clock input CK. Accordingly, in this case, the loaded numeral is counted up by two.

Thereafter, the numeral signal holding the same numeral as before or counted up by one or two is transmitted from the counter CO12 to a latch LA3 and then the loaded numeral signal in the counter CO12 is reset by a delayed pulse from a delay circuit D4. The numeral signal held in the latch LA3 is further transmitted to a decoder 20 having an output terminal formed by a plurality of taps which are respectively connected through OR gates OR11 to OR1M (FIG. 2) to light emitting diodes LE1 to LEM (FIG. 2). The light emitting diodes LE1 to LEM connected to the respective taps are aligned along a scale marked with figures corresponding to aperture values as shown at a place 20c of FIG. 6 with a pitch of 0.5 EV. In other words, the second display means can display a value of exposure parameter in increments of 0.5 EV. In the arrangement shown in FIG. 6, each of the light emitting diodes illuminates in a shape of an elongated needle capable of pointing to a place in the depicted scale. It is to be noted that the marked figures can be replaced with those corresponding to exposure values, when the exposure value is to be displayed.

Upon receipt of the numeral signal from the latch LA3, the decoder 20 produces a high level signal from one output tap located at a place relative to the applied numeral signal. The other output taps are maintained low. Accordingly, a light emitting diode located at a place relative to the numeral signal applied to the decoder 20 is lit to indicate the aperture value calculated in the calculator 31. Once the light emitting diode is lit, it is maintained lit until a reset signal is provided from the reset switch.

Since each memory unit and a set of latches LA1 and LA2 is coupled with a decoder having the same structure as the above described decoder DC1, every light intensity signal held in the set of latches LA1 and LA2 and in the respective memory units is immediately calculated to a suitable value such as an aperture value and displayed on the scale.

Referring back to FIG. 2, the memory command means m7 includes a memory command switch S1 which, when closed, produces a high level signal, an AND circuit A1 connected to the switch S1 and an up-counter CO3 connected to the AND circuit A1 and capable of counting up to "N", i.e., the number identical to the number of the provided memory units. The reset of the counter CO3 is carried out by a pulse applied to a reset-enable terminal RE from an OR circuit OR1. Accordingly, when the power is supplied to provide a pulse to the terminal ACL or when a reset switch S2 is turned on, a pulse applied to the reset-enable terminal RE of the up-counter CO3 resets to load the counter CO3 with "0". The output of the up-counter CO3 is fed back through a NAND circuit NA1 to the input of the AND circuit A1 for preventing, when the counter CO3 has counted up to its maximum, the AND circuit A1 from transmitting the pulse signal from the memory command switch S1 to the counter CO3. Also, when no light intensity signal is held in the latches LA1 and LA2, the low level signal from the flip-flop circuit F/F10 is applied to the input of the AND circuit A1 for preventing the AND circuit A1 from transmitting the pulse signal from the switch S1 to the counter CO3. In other words, whenever there is a vacant or empty unit, and whenever there is a light intensity signal held in the latches LA1 and LA2, the counter CO3 is ready to count up one upon receipt of a pulse from the switch S1.

In order to store the light intensity signal, the operator closes the switch S1 to produce a pulse. If this storing operation is the first one, the produced pulse from the switch S1 is applied to the counter CO3 for setting up a numeral "1". The numeral signal produced from the counter CO3 is applied to the control terminal C1 of the demultiplexer DMP1 for transmitting the light intensity signal in the latches LA1 and LA2 to the first memory unit M1. This transmitting operation is carried out within a predetermined period of time set by a monostable circuit MM1 which is actuated upon receipt of a counting pulse from the AND circuit A1. It is to be noted that the stored signal is immediately used for the dot display which is carried out by the second display means m6.

When another light intensity signal is applied to the latches LA1 and LA2, and if this signal is also to be stored, the operator again turns on the switch S1 for setting up a numeral "2" in the counter CO3. This numeral signal causes the transmittal of the light intensity signal from the latches LA1 and LA2 to the second memory unit M2. By repeating a similar operation, the operator may store N pieces of different light intensity signals.

The numeral signal produced from the counter CO3 is also applied through the line 40 to the dot display control circuit 10 for actuating the OR circuits included therein in the manner described above in connection with FIG. 3, and to a down-counter CO4 of the memory recall means m8.

The memory recall means m8 includes a memory recall switch S3 which, when closed, produces a high level signal. Connected to the switch S3 are a monostable circuit MM2 which produces a one shot pulse upon receipt of the step up of the high level signal from the switch S3, and a data selector DS1 which connects its output terminal to ground when a low level signal is applied thereto from the switch S3 and connects its output to the output of a latch LA3 when a high level signal is applied. The output from the monostable circuit MM2 is applied to a delay circuit D3 and also to a clock input of a latch LA4. A delayed pulse signal from the delay circuit D3 is applied to a clock input of the down-counter CO4 which produces a numeral signal from its output terminal Q. This output terminal Q is connected to the latch LA4 which is, in turn, connected to the data selector DS1. The output of the data selector DS1 is connected to the control terminal C2 of the multiplexer MP2. The memory recall means m8 further includes a NOR circuit NO1 connected to the output terminal Q of the down-counter CO4. The output terminal of the NOR circuit NO1 is connected to one input of an OR circuit OR2 which is, in turn, connected to a preset-enable terminal PE of the down-counter CO4. Also connected to the input of the OR circuit OR2 are the terminal ACL through a delay circuit D1, and the AND circuit A1 through a delay circuit D2.

When the power is turned on, a pulse produced from the ACL terminal is applied through the delay circuit D1 and the OR circuit OR2 to the preset-enable terminal PE to load the down-counter CO4 with the numeral signal held in the up-counter CO3. Since the up-counter CO3 is loaded with "0" when power is turned on, the numeral signal loaded in the down-counter CO4 will be "0". The numeral of the loaded signal in the down-counter CO4 increases as the numeral in the up-counter CO3 increases by the storing operation. For example, when the storing operation is carried out for "A" times to set up a numeral signal "A" in the up-counter CO3, the down-counter CO4 also sets up a numeral signal "A". In this condition and when the switch S3 is maintained open, no signal is shifted from the down-counter CO4 to the latch LA4, and a low level signal indicative of a numeral signal of "0" is produced from the data selector DS1 and fed to the control input C2 of the multiplexer MP2. Accordingly, the multiplexer MP2 is actuated so as to connect its inputs Z0 and Y0 with its outputs O1 and O2 to display on the segment display 8 a value of exposure parameter using the light intensity signal from the latches LA1 and LA2 as described above. When the switch S3 is closed, a high level signal is applied from the switch S3 to the data selector DS1, and at the same time, a pulse is supplied from monostable circuit MM2 to the latch LA4. Accordingly, the numeral signal "A" loaded in the down-counter CO4 is shifted to the latch LA4, and the date selector DS1 is so actuated as to provide the numeral signal A from the latch LA4 to the control terminal C2 of the multiplexer MP2. Thereupon, the multiplexer connects its input terminals ZA and YA with its outputs O1 and O2 to display on the segment display 8 a value of exposure parameter using the light intensity signal from the memory unit MA, that is, the memory unit with the most recently stored light intensity signal. The display of the exposure parameter value using the data from the memory unit MA lasts until the operator turns off the switch S3. After a predetermined period of time from a moment when the pulse is produced from the monostable circuit MM2, the delay circuit D3 provides a pulse to the clock terminal of the down-counter CO4. Accordingly, the down-counter CO4 counts down by one to set up a numeral signal "A-1".

Thereafter, when the operator again turns on the switch S3, a similar operation is carried out to transmit the numeral signal "A-1" to the control terminal C2 of the multiplexer MP2 and to set up a numeral signal "A-2" in the down-counter CO4. By repeating the above operation, the operator can sequentially display the exposure parameter value using the stored light intensity signal from the latest stored signal to the oldest stored signal. When the down-counter CO4 has counted down to "0", the NOR circuit NO1 produces a high level signal to the OR circuit OR2 and further to the preset-enable terminal PE of the down-counter CO4 to load the down-counter CO4 with the numeral signal from the up-counter CO3. The down-counter CO4 is also preset and loaded with the numeral signal from the up-counter CO3 when the AND circuit A1 produces a pulse signal, that is when the storing operation is carried out.

Figure 5:
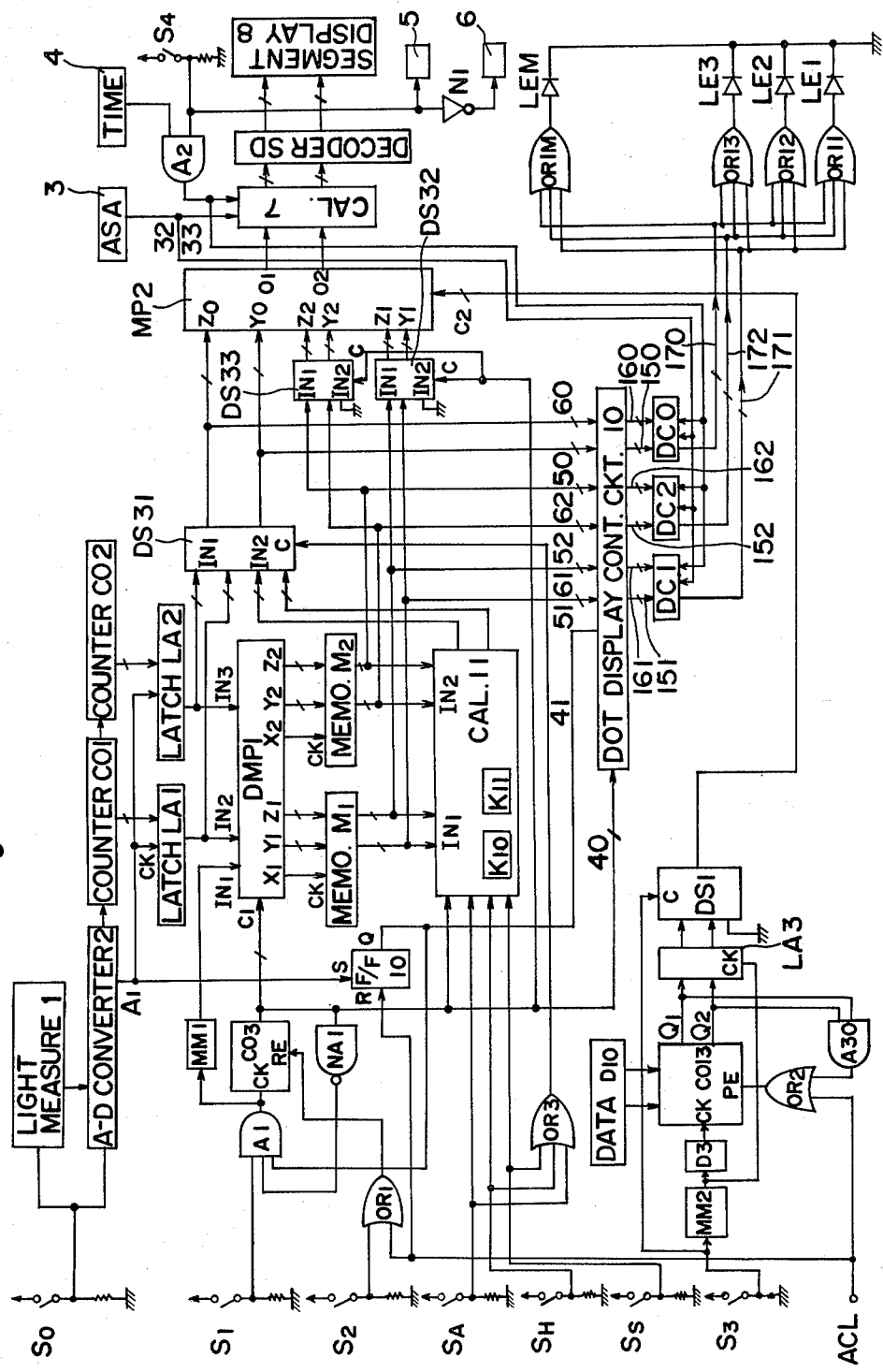
FIG. 5 is a circuit diagram according to the second embodiment of the present invention.

Referring to FIG. 5, there is shown a detailed block diagram of a light meter according to a second embodiment of the invention. When compared with the first embodiment, the second embodiment further has a calculate means constituted by a calculator 11. The calculator 11 receives light intensity signals from the memory units M1 and M2 and calculates a modified light intensity, such as an average light intensity between the two values stored in the memory units M1 and M2. The calculation carried out in the calculator 11 will be described in detail later. The modified light intensity signal produced from the calculator 11 is applied to a data selector DS31 which selects one data value from those values obtained from the set of latches LA1 and LA2 and from the calcuator 11.

Furthermore, according to the second embodiment, the light intensity signal from respective memory units M1 and M2 is applied to the multiplexer MP2 through respective data selectors DS32 and DS33. Moreover, in place of the down-counter CO4 provided in the memory recall means m8, an up-counter CO13 which is capable of counting up to "3" is provided. A further detail of the arrangement of the second embodiment will become apparent from the description below given together with the operation thereof.

When the power is supplied to the circuit of FIG. 5, a pulse appears at the terminal ACL which is applied through OR circuit OR2 to the preset-enable terminal of the up-counter CO13 for loading the up-counter CO13 with a numeral "1" received from a data setting circuit D10 which carries a data indicative of a numeral "1". The pulse from the terminal ACL is also applied to the R-S flip-flop circuit F/F10 for resetting the same, and to the up-counter CO3 for loading the up-counter CO3 with a numeral "0". At this point all the light emitting diodes LE1 to LEM are not lit. Then, when the switch S0 is turned on, the light intensity of an object is measured, and the measured light intensity value Bv expressed in APEX is stored in the latches LA1 and LA2 in the same manner as described above. Since the control terminal of the data selector DS31 is supplied with a low level signal, the signal of light intensity contained in the latches LA1 and LA2 are supplied to the multiplexer MP2 for the segment display and also to the dot display control circuit 10 for the dot display. The control terminal of the data selector DS31 receives a high level signal when any one of control command switchs SA, SH or SS is turned on.

At this condition, when the recall switch S3 is turned on, the latch LA3 receives and holds the numeral signal indicative of "1" from the up-counter CO13, and applies this numeral signal of "1" to the control terminal of the multiplexer MP2 to select input terminals Y1 and Z1 for the connection with the output terminals O1 and O2.

After sending the numeral signal to the latch LA3, the up-counter CO13 counts up from "1" to "2". At this condition, since the up-counter CO3 of the memory command means m7 is producing a numeral signal of "0", the data selector DS32 selects input IN2, which is grounded, for the connection with the input terminals Y1 and Z1 of the multiplexer MP2. Accordingly, during the switch S3 is on, the input of the calculator 7 is grounded to cause the segment display 8 to display "0" for the indication of no signal contained in the first memory unit M1.

Thereafter, if the recall switch S3 is turned off and again turned on, the latch LA3 receives and holds the numeral signal of "2" from the up-counter CO13, and applies this numeral signal of "2" to the control terminal of the multiplexer MP2 to select input terminals Y2 and Z2 for the connection with the output terminals O1 and O2. However, since the data selector DS33 supplies a ground potential to the input terminals Y1 and Z1 in a similar manner described above, the segment display 8 again displays "0" for the indication of no signal contained in the second memory unit M2.

It is to be noted that the up-counter CO13 counts up from "2" to "3" after a predetermined period from the moment when the switch S3 is turned on for the second time to produce BCD signals (1,1) from its output taps Q1 and Q2. Thereupon, the AND circuit 30 is actuated so as to produce a high level signal which is applied through the OR circuit OR2 to the preset-enable terminal PE of the up-counter CO13 for loading the up-counter CO13 with a numeral signal of "1" which is obtained from the data setting circuit D10.

Next, when the memory switch S1 is turned on, the up-counter CO3 counts up from "0" to "1" to apply a numeral signal of "1" to the demultiplexer DMP1. Accordingly, the light intensity signals stored in the latches LA1 and LA2 are transmitted to the memory unit M1 in the same manner as described above. Then, the operator may again turn on the switch S0 to measure the light intensity of another object, and then turn the memory switch S1 on to store the light intensity of said another object in the second memory unit M2. The stored signals in the memory units M1 and M2 are supplied to the second display means m6 for the dot display of exposure parameter values each based on respective stored signals.

Thereafter, when the recall switch S3 is turned on, the latch LA3 receives and holds the numeral signal of "1" from the up-counter CO13, and applies this numeral signal of "1" to the control terminal of the multiplexer MP2 to select input terminals Y1 and Z1 for the connection with the output terminal O1 and O2. Since the up-counter CO3 now holds a numeral signal of "2", the data selector DS32 selects input IN1 for the connection with the terminals Y1 and Z1. Accordingly, during the recall switch S3 is on, the light intensity signal stored in the memory unit M1 is transmitted to the calculator 7 for the calculation of the value of the exposure parameter, such as the aperture value, or the exposure value, based on the light intensity signal from the memory unit M1. The calculated value of exposure parameter is then displayed through the segment display 8.

Then, when the recall switch S3 is turned on again for the second time, the latch receives and holds the numeral signal of "2" from the up-counter CO13, and applies the numeral signal to the multiplexer MP2 for transmitting the light intensity signal stored in the second memory unit M2 to the calculator 7. Accordingly, the calculated value based on the light intensity signal from the memory unit M2 is displayed through the segment display 8.

To actuate the calculator 11 to produce a modified light intensity, one of the switches SA, SH and SS is turned on. When the switch SA is turned on, the calculator 11 performs the calculation of $$(BvH - BvL)K + BvL \tag{1}$$

in which BvH is the greater one of the light intensity signals stored in the memory units M1 and M2, BvL is the smaller one of the same, and K is a constant, such as "0.5", to provide an average light intensity Bva between the two light intensities stored in the memory units M1 and M2. The calculator 11 can be so arranged as to change the constant K by a suitable switch means (not shown) to other numerals, such as "0.25" or "0.75", to allow the operator to select a desired value. When the switch SA is turned on, a high level signal is applied through an OR circuit OR3 to the control terminal C of the data selector DS31 to transmit the average light intensity signal Bva to the multiplexer MP2 and to the dot display control circuit 10. Accordingly, when the switch SA is turned on, the segment display 8 displays a value of exposure parameter based on the average light intensity Bva, and at the same time, one light emitting diode is lit for the indication of the same value by way of the dot display. It is to be noted that when the data selector DS31 selects the data from the calculator 11, any data from the latches LA1 and LA2 are intercepted at the data selector DS31.

When the switch SH is turned on, the calculator 11 performs the calculation of $$BvH - K10 \tag{2}$$

in which K10 is a constant, to provide an exposure with which an object portion with the brightness BvH is pegged at a predetermined highest portion on the upper straight line of the characteristic curve of a film. This exposure determination is referred to as its high light oriented exposure. The resultant value of the above calculation (2) is then used for the display of value of exposure parameter through the segment display 8 and dot display in a similar manner described above. Next, the feature of the high light oriented exposure is further explained. If the aperture value normally calculated in the calculator 7 using the light intensity BvH is 5.6, it means that the portion of the object with the light intensity BvH will be reproduced as a half-tone picture when the object is photographed with the aperture of 5.6. In other words, an object portion further brighter than the measured object portion with the light intensity BvH will be reproduced as a high-tone picture. If the operator wishes to reproduce the object portion with the light intensity BvH as the highest available tone, he may turn on the switch SH to obtain a larger size aperture, such as 2.8.

When the switch SS is turned on, the calculator 11 performs the calculation of $$BvL + K11 \tag{3}$$

in which K11 is a constant, to provide an exposure with which an object portion with the brightness is pegged at a low but a safe point on the toe of the characteristic curve of a film. This exposure determination is referred to as shadow oriented exposure which has the opposite feature to that of the high light oriented exposure. Then, the resultant value of the calculation (3) is used for the display of value of exposure parameter through the segment display 8 and dot display in a manner similar to that described above in connection with the high light oriented exposure.

The detail of the above mentioned high light and shadow exposure methods are disclosed in "Exposure Manual" written by J. F. Dunn, published by Fountain Press London, with Copyright of 1958 especially page 202 and its following chapter thereof.

Figure 6:
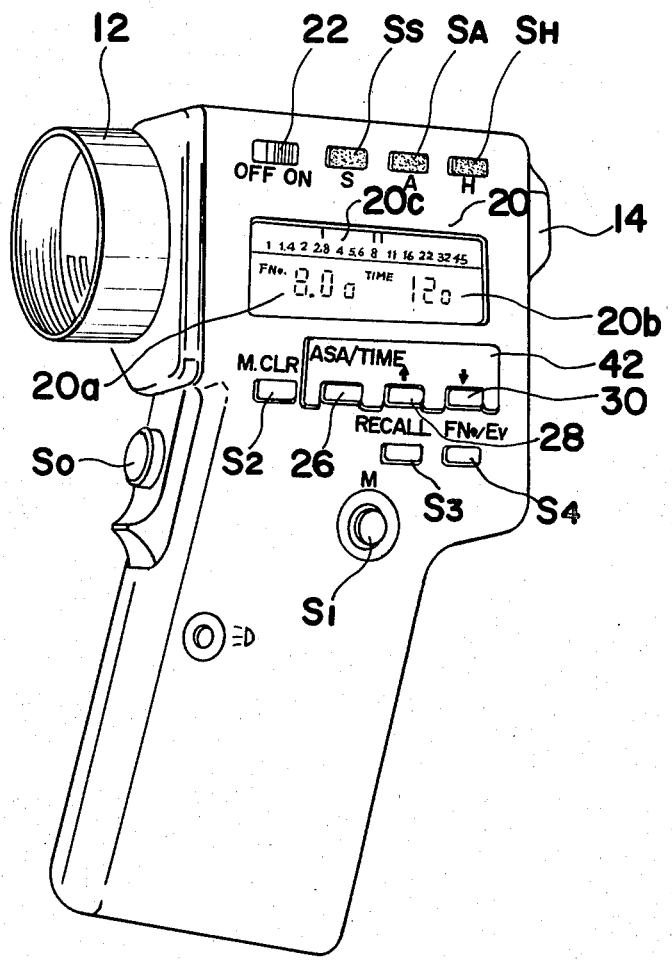
FIG. 6 is a perspective view of a light meter designed according to the second embodiment.

Referring to FIG. 6, there is shown a perspective view of a light metering according to the second embodiment. The light meter shown includes an objective lens assembly 12 and an eye piece 14. A power switch 22 is provided for turning on and off the light meter. When the switch 22 is turned on, a pulse is applied to the ACL terminal as described above. The calculation select switches SS, SA and SH are provided adjacent to the power switch 22. Provided below the objective lens assembly 12 is the switch S0 for effecting the light intensity measuring operation. The measured light is calculated into a suitable exposure parameter such as an aperture which is immediately displayed through a display window 20 by way of dot display and segment display. The memory switch S1 is provided in the grip of the light meter. When the memory switch S1 is pushed, the measured light intensity shifts to the memory unit. Provided above the memory switch S1 is the recall switch S3 and the parameter selecting switch S4. The parameter selecting switch S4 is pushed to alternately change the type of exposure parameter to be displayed in the segment display from aperture value to exposure value or vice versa. Provided above the switches S3 and S4 are memory clear switch S2, ASA/TIME selecting switch 26, count-up switch 28 and count-down switch 30. When the ASA/TIME selecting switch 26 is pushed, the information to be set is alternately changed from ASA number (film sensitivity) to shutter speed or vice versa. The setting operation is carried out by the count-up and count-down switches 28 and 30, and the set value is display at a portion 206 in the display window. A plate 42 having a thickness equal to or larger than the height of each button of the switches 26, 28 and 30 is mounted on the buttons of the switches 26, 28 and 30 for avoiding unwilling pushing of these buttons.

It is to be noted that the light meter according to the present invention can be used to measure not only objects at different places, but also an object at different times under different conditions.

Furthermore, the calculation carried out in the calculator 11 is not limited to that given above with reference to formula (1), (2) and (3), but any other calculation, such as for calculating override of the camera, can be employed.

Moreover, the calculation can be carried out through logarithmically compressed parameters or through linear parameters.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A light meter comprising:
   a receiving means for receiving light and for producing a light intensity signal which varies with the intensity variations of the received light;
   a storing means for storing at least one light intensity signal produced from said receiving means;
   a selecting means for selecting one light intensity signal from the light intensity signals received by the receiving means or stored by the storing means;
   a first display means for dislaying, through numeral figures, a value depending on the selected light intensity signal; and
   a second display means for sequentially displaying, by means of selective actuation of display dots, values rspectively depending on light intensity signals obtained from said receiving means and from said storing means.

2. A light meter as claimed in claim 1, wherein said storing means includes a pair of storage elements for storing two light intensity signals obtained from said measuring means.

3. A light meter as claimed in claim 1, wherein said first display means comprises a means for depicting at least two place numerals, and wherein said second display means comprises a scale along which said display dots are aligned.

4. A light meter as claimed in claim 3, wherein said means for depicting depicts as precisely as at least the first place numeral of the fraction, so as to display the value in increments of $0.1 E_v$.

5. A light meter as claimed in claim 3, wherein said display dots are aligned along the scale with a pitch of $0.5 E_v$.

6. A light meter as claimed in claim 1, further comprising a means for generating a film sensitivity signal depending on a film sensitivity setting, and a means for generating an exposure value signal by associating said film sensitivity signal with respective light intensity signals, wherein said first and second display means are arranged to indicate exposure values in response to said exposure value signal.

7. A light meter as claimed in claim 1, further comprising: a means for generating a film sensitivity signal depending on a film sensitivity setting; a means for generating an aperture value signal obtained through a calculation using said film sensitivity signal, said shutter speed signal and said light intensity signal; wherein said first and second display means are arranged to indicate aperture values in response to said aperture value signal.

8. A light meter as claimed in claim 1, further comprising: a means for calculating a modified light intensity value using the light intensity signals stored in said storing means; wherein the modified light intensity value signal produced by the means for calculating is applied to said selecting means and also to said second display means; and wherein said selecting means selects one light intensity signal from among light intensity signals obtained from said receiving means, said storing means and said calculating means; and wherein said second display means further displays a value depending on the modified light intensity value obtained from said calculating means.

9. A light meter as claimed in claim 8, wherein said calculating means comprises a means for averaging stored light intensity signals, and wherein said modified light intensity value signal is an average light intensity signal of light intensity signals stored in said storing means.

10. A light meter as claimed in claim 8, wherein said calculating means comprises a means for subtracting a predetermined value from the maximum light intensity signal stored in said storing means, and wherein said modified light intensity value signal is the high-light oriented exposure data value.

11. A light meter as claimed in claim 8, wherein said calculating means comprises a means for adding a predetermined value to the minimum light intensity signal stored in said storing means, and wherein said modified light intensity value signal is the shadow-light oriented exposure data value.

12. A light meter as claimed in claim 1, wherein said second display means comprises a plurality of decoders each comprising:
- a data selector which receives a fraction portion of a value of exposure parameter;
- a logic circuit connected to said data selector for determining whether a first place numeral in said fraction portion falls in a first range including 0, 1 and 2, a second range including 3, 4, 5, 6 and 7, or a third range including 8 and 9, and producing none, one and two pulse signals when said first place numeral in said fraction portion falls in said first, second and third ranges, respectively; and
- an up-counter which receives an integer portion of the value of exposure parameter, said up-counter being arranged to double the received integer portion and then to count up zero, one or two according to the number of pulses obtained from the logic circuit.

13. A light meter as claimed in claim 1, further comprising a memory command means coupled to said storing means, said memory command means producing a memory command signal for determining a timing for carrying out the storing operation in said storing means, and specifying a section in said storing means in which the light intensity signal is to be stored.

14. A light meter as claimed in claim 1, further comprising a memory recall means coupled to said selecting means, said memory recall means producing a recall signal for determining a timing for carrying out the selecting operation in the selecting means, and specifying a section in said storing means from which the light intensity signal is to be selected.

* * * * *